United States Patent
Mattam et al.

(10) Patent No.: US 12,225,473 B2
(45) Date of Patent: Feb. 11, 2025

(54) METHODS AND SYSTEMS FOR POWER MANAGEMENT IN AN UPLINK TRANSMISSION

(71) Applicant: SAMSUNG ELECTRONICS CO., LTD., Suwon-si (KR)

(72) Inventors: Jajohn Mathew Mattam, Karnataka (IN); Manasi Ekkundi, Karnataka (IN); Rishav Agarwal, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 17/949,761

(22) Filed: Sep. 21, 2022

(65) Prior Publication Data

US 2023/0085836 A1    Mar. 23, 2023

(30) Foreign Application Priority Data

Sep. 21, 2021   (IN) .............................. 202141042765
Sep. 9, 2022    (IN) .............................. 202141042765

(51) Int. Cl.
*H04W 52/14*   (2009.01)
*H04W 52/24*   (2009.01)
(Continued)

(52) U.S. Cl.
CPC ....... *H04W 52/146* (2013.01); *H04W 52/242* (2013.01); *H04W 52/34* (2013.01); *H04W 52/367* (2013.01)

(58) Field of Classification Search
None
See application file for complete search history.

(56) References Cited

U.S. PATENT DOCUMENTS 8,606,287 B2 * 12/2013 Landau ................ H04B 7/0417
                                                           455/450
8,838,161 B2 *  9/2014 Lee .................... H04W 52/267
                                                           455/69
(Continued)

FOREIGN PATENT DOCUMENTS

EP          2 934 030         10/2015

OTHER PUBLICATIONS

Mateus P. Mota et al., "Adaptive Modulation and Coding based on Reinforcement Learning for 5G Networks", accepted for presentation at the IEEE Globecom 2019, submitted on Nov. 25, 2019, 6 pp., available at URL: https://arxiv.org/abs/1912.04030.

(Continued)

*Primary Examiner* — Tuan A Tran
(74) *Attorney, Agent, or Firm* — Nixon & Vanderhye P.C.

(57) ABSTRACT

Methods and/or systems for power management by a user equipment (UE) in an uplink transmission. The method may include determining, whether feedback related to transmit power of the UE, from a network entity is available and determining a first transmit power of the UE based on the determination and at least one of a plurality of transmitting parameters associated with the UE, evaluating a first spectral efficiency of the UE upon transmitting data at the first transmit power in a predefined time duration, determining a plurality of second transmit power. The method may include evaluating a plurality of second spectral efficiencies and determining a maximum spectral efficiency among the first and the plurality of second spectral efficiencies and transmitting the data at final transmit power among the first and the second plurality of second spectral efficiencies, the final transmit power corresponds to the maximum spectral efficiency.

19 Claims, 15 Drawing Sheets

(51) Int. Cl.
    *H04W 52/34*    (2009.01)
    *H04W 52/36*    (2009.01)
    *H04W 72/21*    (2023.01)
    *H04W 72/23*    (2023.01)

(56) References Cited

U.S. PATENT DOCUMENTS

| | | | | |
|---|---|---|---|---|
| 8,861,443 | B2* | 10/2014 | Shirani-Mehr | H04W 52/12 |
| | | | | 370/328 |
| 8,942,756 | B2* | 1/2015 | Rongzhen | H04W 52/243 |
| | | | | 455/161.3 |
| 9,225,478 | B2* | 12/2015 | Chen | H04W 36/22 |
| 9,432,950 | B2* | 8/2016 | Chen | H04W 52/146 |
| 10,021,704 | B2* | 7/2018 | Bontu | H04W 72/542 |
| 10,524,213 | B2* | 12/2019 | Nagaraj | H04L 1/0003 |
| 10,594,434 | B2* | 3/2020 | Prasad | H04L 1/0027 |
| 10,708,088 | B2* | 7/2020 | Park | H04W 72/04 |
| 10,771,184 | B2* | 9/2020 | Kela | H04W 72/00 |
| 10,779,325 | B2* | 9/2020 | Yang | H04W 52/50 |
| 10,820,277 | B2* | 10/2020 | Kang | H04W 52/50 |
| 10,904,782 | B2* | 1/2021 | Nam | H04B 7/0404 |
| 11,418,238 | B2* | 8/2022 | Manolakos | H04B 7/0626 |
| 11,546,858 | B2* | 1/2023 | Huang | H04W 72/21 |
| 11,595,909 | B2* | 2/2023 | Park | H04W 52/146 |
| 11,737,031 | B2* | 8/2023 | Yang | H04W 52/16 |
| | | | | 455/522 |
| 11,778,566 | B2* | 10/2023 | Rico Alvarino | H04L 1/0003 |
| | | | | 370/318 |
| 11,799,695 | B2* | 10/2023 | Park | H04W 72/046 |
| 11,838,987 | B2* | 12/2023 | Raghavan | H04W 48/14 |
| 2013/0258968 | A1* | 10/2013 | Hong | H04L 1/0009 |
| | | | | 370/329 |
| 2015/0289124 | A1 | 10/2015 | Palin et al. | |
| 2016/0050631 | A1 | 2/2016 | Wen et al. | |
| 2019/0327686 | A1 | 10/2019 | Zhang et al. | |
| 2020/0068496 | A1 | 2/2020 | Yang et al. | |

OTHER PUBLICATIONS

India Office Action dated Aug. 2, 2023 for IN Application No. 202141042765.

* cited by examiner

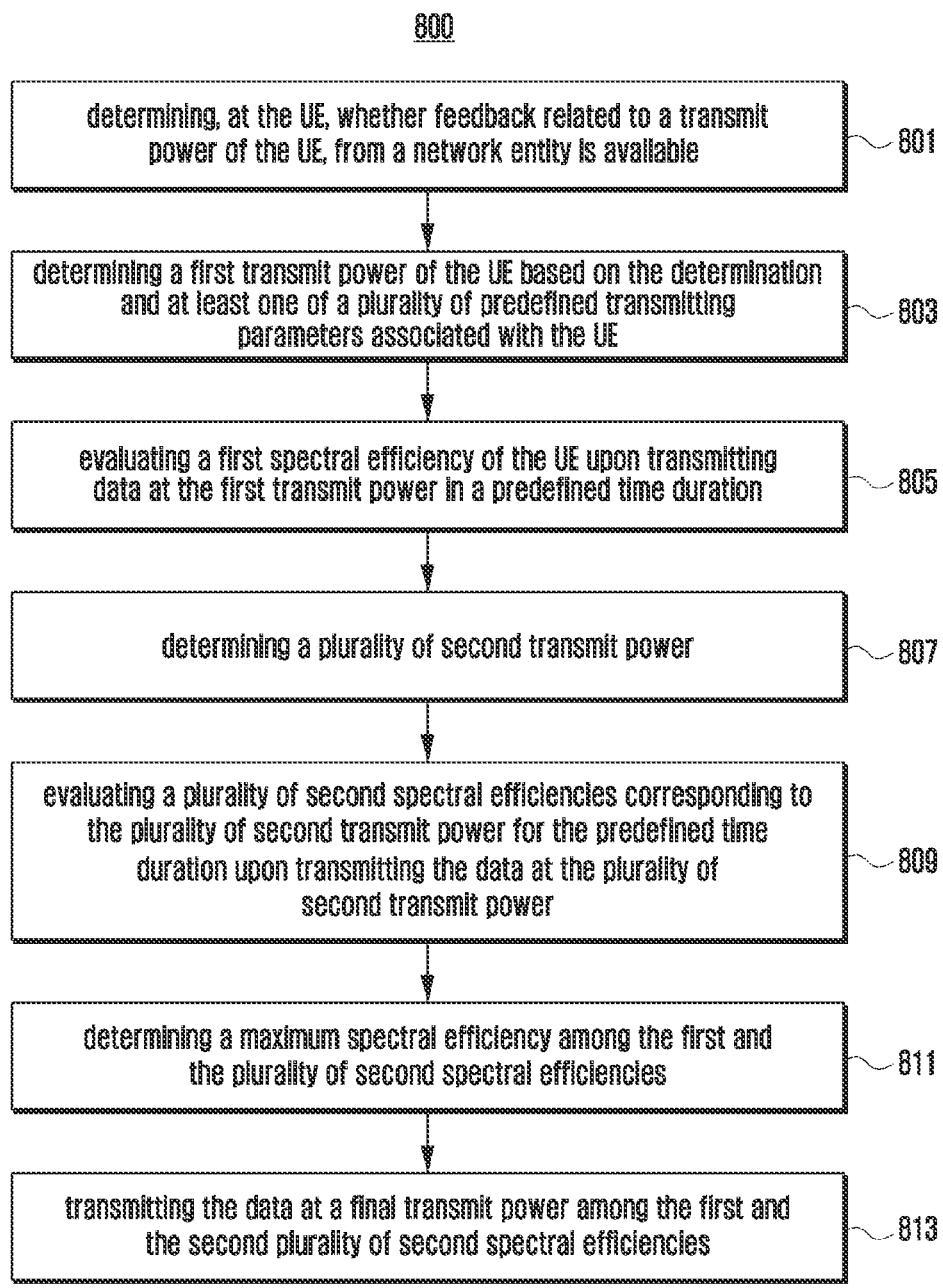

METHODS AND SYSTEMS FOR POWER MANAGEMENT IN AN UPLINK TRANSMISSION

CROSS-REFERENCE TO RELATED APPLICATIONS

This application claims priority to Provisional IN Patent Application No. 202141042765, filed Sep. 21, 2021, and to Non-Provisional IN Patent Application No. 202141042765, filed Sep. 9, 2022, the disclosures of which are all hereby incorporated by reference herein in their entireties.

BACKGROUND

Field

Example embodiments may relate to methods and/or systems for power management by a user equipment (UE) in an uplink transmission.

Description of Related Art

In wireless network, there are two different way of power control mechanism in a user equipment (UE), e.g., open loop power control and closed (inner) loop power control. In open loop power control, there is no feedback input from a network and the UE determines its transmission power by its own method. In closed loop power control, there is feedback input from the network and the UE determines a transmission (Tx) power and modifies the Tx power based on the feedback from the network (e.g., transmit power control (TPC)). FIG. 1 illustrates signal diagram depicting open loop power control and closed loop power control, in accordance with existing art. As shown in FIG. 1, open Loop Control is a mechanism to determine physical random access channel (PRACH) transmission power (no control from network) based on measured reference signal received power (RSRP)/pathloss. This indicates that the UE continues to depend on Tx power calculated based on open loop mechanism which was used during the initial transmissions and is proportional only to the pathloss measured based on RSRP. Closed loop control is a mechanism of physical uplink shared channel (PUSCH), while a UE is in connected mode and is controlled by network using TPC commands.

FIG. 2 illustrates signal diagram for key performance indicator (KPI) adjustment when inner loop is supported by the network, in accordance with existing art. As shown in FIG. 2, transmit (Tx) power is determined based on RSRP/pathloss. Then, the data is transmitted with Tx power to the network. The network then determines if the Tx power is to be reduced based on error rate and send this information to the UE in TCP bits. The UE modifies Tx power based on TCP bits and transmits data to the network using the modified Tx power. The network keeps evaluating Tx power and sends information through TCP bits. Then, if error rate is still high, then Modulation and Coding Scheme (MCS) is reduced to reduce the error rate.

FIG. 3 illustrates signal diagram for key performance indicator (KPI) adjustment when inner loop is not supported by the network, in accordance with existing art. As shown in FIG. 3, Tx power is determined based on RSRP/pathloss. Then, the data is transmitted with Tx power to the network. Then, if error rate is still high, then Modulation and Coding Scheme (MCS) is reduced to reduce the error rate. As can be seen from FIG. 3, there is no feedback from the network to the UE. Hence, there is no Tx power modification. The Tx power is always proportional to pathloss. This in turn result in network performing link adaptation in uplink (by reducing MCS) to control the error rate. The link adaptation also happens even if the closed loop is supported by network, but the need or effect of the same is minimal as error rate is reduced after choosing the optimal Tx power based on network feedback on Tx power. But, when closed loop is not supported by network, the effect of link adaptation is more as this is the only way of reducing error rate.

FIG. 4 illustrates a network environment depicting a normal uplink transmission, in accordance with existing art. In uplink (UL), the most nominal Tx power for the best UL performance may be obtained with the presence of closed loop power control mechanism as this is based on the network feedback. This takes care of all UE parameters and network parameters and make sure that the UL Tx power is optimal to achieve the best quality of service (QoS) in UL. But current new radio (NR) networks do not support inner loop power control and hence the UE uses only open loop power control to finalize the Tx power. Just with the Tx power calculated using open loop power control, the UL QoS of UE may not be the best as the UE is unaware of the network conditions (no inner loop). This results in UE not achieving the best UL QoS always. As shown in FIG. 4, in the absence of network feedback, a UE 101 does not increment its Tx power even though there is room for increment. The UE may calculate Tx power based on downlink (DL) KPIs such as RSRP and the allocated UL resources and since it is not aware of network side KPIs, it will keep transmitting at same TX power. Network reduces MCS to perform Link Adaptation (LA) which result in lower QoS.

FIG. 5 illustrates a flow chart for open loop Tx power selection mechanism, in accordance with existing art. As shown in FIG. 3, Tx power is calculated using signalling parameters, path loss and other parameters such as # Resource block (RBs), P0nominal (e.g., information element (IE) configured by network). Then, data is transmitted with minimum of (Tx power and maximum allowed transmit power for the UE). However, in this mechanism, following issues are observed—

Due to multiple reasons such as hardware capability/performance, UE orientation etc., the radio frequency (RF) measurements can vary from UE to UE For example, UE 1 measures better RSRP when compared to UE 2. This RSRP difference results in pathloss difference. Hence, the Tx power calculated with outer loop calculation is less in UE 1 when compared to UE 2. Because of this difference, network can decode the packets from UE 2 in a better way resulting in less UL block error rate (BLER) when compared to UE 1. As there is no close(inner) loop mechanism, the network is not able to request UE 1 to increase the Tx power and hence to bring the BLER % less, the network has to compromise the MCS value allocated to UE1. This results in lower UL throughput (TPUT)/QoS for UE 1. This affects the user as the QoS in UL has to be compromised. This kind of behavior can affect in other way also as if UE is sending in more Tx power resulting in higher interference at network side, there is no option for network to ask UE to reduce the Tx power as well. This also results in high UL BLER (due to network not able to decode packets properly) and reducing UL MCS due to link adaptation.

Further, in case of simultaneous transmission on different cells (e.g.: carrier aggregation (CA), dual sim dual active (DSDA), dual active protocol stack (DAPS) etc), to meet the specific absorption rate (SAR) criteria, UEs restrict the maximum Tx power in each cell. For example, in case of NR sub6 UL CA of 2CC, if the Pcmax is 23 dB, UE restricts each cell to 20 dB each maximum value. This limit gets applied even when one of the cells is not transmitting at maximum power and maximum power is restricted which means, UE is not completely using the allowed Tx power in these cases and restrict the Tx power. This case is also applicable for a DSDA UE where there can be simultaneous transmission in both stacks and the maximum power is limited. Another example is DAPS handover (HO) where target stack random access channel (RACH) Tx power might be limited due to source's UL TX happening at higher TX power due to poor signal conditions.

FIG. 6 illustrates a network environment depicting a simultaneous transmissions on dual stacks, in accordance with existing art. There is un-optimized utilization of TX power in UL CA, in existing art. This is due to UE being in different positions w.r.t antenna of the 2 co-located cells. As shown in FIG. 6, there are scenarios where the UE may require more power to transmit on 1 cell and less on other. When it comes to UL CA (FR2 CA in this case), the UE split the Tx power between cells. Consider a case, where it is 2 UL CA and the maximum transmit power limit (MTPL) is set to 7.0 dB (varies based on beam and cell). In this case, UE split the max Tx power between 2 cells and is set as 4 dB for each cell. But in this case, it is possible that one of the cell may need Tx power less than the maximum set value whereas the other cell may need more than the max set value. For example, If Pcell's calculated Tx power is 0 dB and Scell's Tx power is 10 dB, Pcell transmits in 0 dB and Scell transmits in 4 dB making it a total of only 4 dB. This is not proper utilization of allowed maximum Tx power in the UE. This also results in higher BLER in Scell (as UE is not transmitting in calculated Tx power) resulting in lower MCS allocation and lower TPUT (low QoS)

FIG. 7 illustrates a network diagram depicting a Dual Active Protocol Stack (DAPS), in accordance with existing art. As shown in FIG. 7, considering the maximum Tx power of the UE as 24.5 dB, after applying DPS, in this case RACH to target cell can be transmitted in 23 dB and data to source cell can be transmitted in 19 dB. But it is possible that the Tx power required for successful RACH in target cell is this maximum allocated. In this case, the Tx power towards the source will be further reduced and the Tx power towards the target may be increased (till max capability of UE) and the total Tx power will be always maintained equal to the UE capability.

Therefore, there is need for a mechanism to handle Tx power during single and multiple transmissions to achieve better UL Quality of Service (QoS).

SUMMARY

This summary is not intended to identify key or essential inventive concepts of the invention, nor is it intended for determining the scope of the invention.

In an example embodiment, there may be provided a method for power management by a user equipment (UE) in an uplink transmission. The method, in an example embodiment, may include determining, at the UE, whether feedback related to a transmit power of the UE, from a network entity is available and determining a first transmit power of the UE based on the determination and at least one of a plurality of transmitting parameters associated with the UE. The method may also include evaluating a first spectral efficiency of the UE upon transmitting data at the first transmit power in a predefined time duration, using a plurality of predefined parameters and determining a plurality of second transmit power, each of the plurality of second transmit power is determined based on one of an increment and decrement from the first transmit power and the plurality of transmitting parameters associated with the UE. The method may also include evaluating a plurality of second spectral efficiencies corresponding to the plurality of second transmit power for the predefined time duration upon transmitting the data at the plurality of second transmit power. The method may also include determining a spectral efficiency (e.g., a maximum spectral efficiency) among the first and the plurality of second spectral efficiencies and transmitting the data at a final transmit power among the first and the second plurality of second spectral efficiencies, wherein the final transmit power corresponds to the maximum spectral efficiency.

In an example embodiment, a method for power management by a user equipment (UE) in an uplink transmission may be provided. The UE may be connected to a plurality of networks. The method may include determining a maximum power transmission level (MTPL) of the UE and determining whether a total transmit power for a plurality of transmission paths of the UE is less than the MTPL. In response to determining that the total transmit power is less than the MTPL, the method may include splitting the MTPL equally into at least two of a first transmit power and a second transmit power among the plurality of transmission paths, wherein a first transmit power corresponds to a first transmission path and the second transmit power corresponds to a second transmission path among the plurality of transmission paths, determining a revised first MTPL, if the first transmit power greater than a first MTPL and second transmit power is less than a second MTPL, wherein the first MTPL corresponds to the maximum power transmission level of first transmission path and the second MTPL corresponds to the maximum power transmission level of second transmission path, determining a revised second MTPL, if the first transmit power is less than the first MTPL and the second transmit power is greater than the second MTPL.

In an example embodiment, a system for power management by a user equipment (UE) in an uplink transmission may be provided. The system may include a memory and a processor coupled to the memory. The processor may be configured to: determine, at the UE, whether feedback related to a transmit power of the UE, from a network entity is available, determine a first transmit power of the UE based on the determination and at least one of a plurality of transmitting parameters associated with the UE, evaluate a first spectral efficiency of the UE upon transmitting data at the first transmit power in a predefined time duration, using a plurality of predefined parameters, determine a plurality of second transmit power, each of the plurality of second transmit power is determined based on one of an increment and decrement from the first transmit power and the plurality of transmitting parameters associated with the UE, evaluate a plurality of second spectral efficiencies corresponding to the plurality of second transmit power for the predefined time duration upon transmitting the data at the plurality of second transmit power, determine a maximum spectral efficiency among the first and the plurality of second spectral efficiencies, and transmit the data at a final transmit power among the first and the second plurality of second spectral efficiencies, wherein the final transmit power corresponds to the maximum spectral efficiency.

In an example embodiment, a system for power management by a user equipment (UE) in an uplink transmission may be provided. The UE may be connected to a plurality of networks. The system may include a memory and a processor coupled to the memory. The processor may be configured to: determine a maximum power transmission level (MTPL) of the UE, determine whether a total transmit power for a plurality of transmission paths of the UE is less than the MTPL. Further, in response to determining that the total transmit power is less than the MTPL, the processor may be configured to: split the MTPL equally into at least two of a first transmit power and a second transmit power among the plurality of transmission paths, wherein a first transmit power corresponds to a first transmission path and the second transmit power corresponds to a second transmission path among the plurality of transmission paths, determine a revised first MTPL, if the first transmit power greater than a first MTPL and second transmit power is less than a second MTPL, wherein the first MTPL corresponds to the maximum power transmission level of first transmission path and the second MTPL corresponds to the maximum power transmission level of second transmission path, and determine a revised second MTPL, if the first transmit power is less than the first MTPL and the second transmit power is greater than the second MTPL.

To further clarify the advantages and features, a more particular description will be rendered by reference to specific example embodiments thereof, which is illustrated in the appended drawing. It is appreciated that these drawings depict only typical/example embodiments and are therefore not to be considered limiting in scope. Certain example embodiments will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein:

FIG. 8 illustrates a flow diagram depicting a method for power management by a user equipment (UE) in an uplink transmission, in accordance with a first example embodiment;

Figure 1:
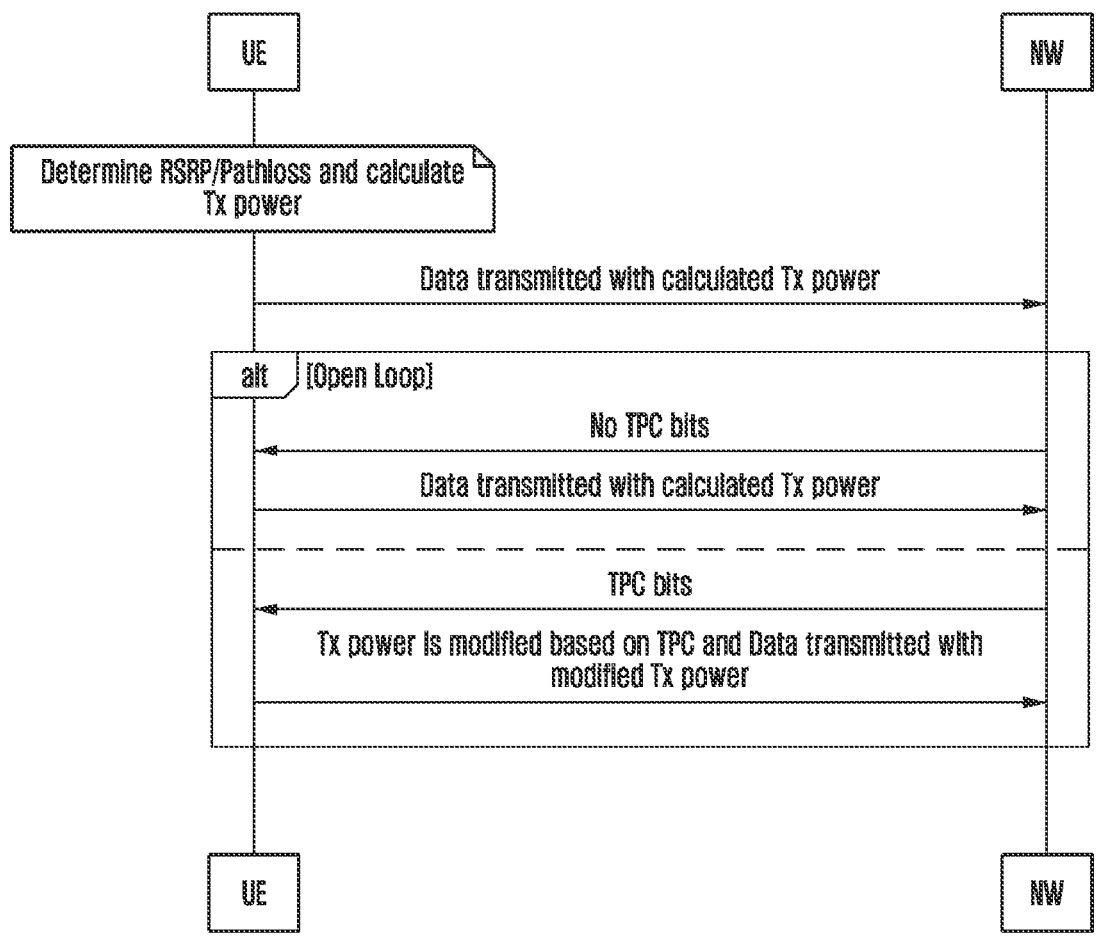
FIG. 1 illustrates signal diagram depicting open loop power control and closed loop power control, in accordance with existing art.
Figure 2:
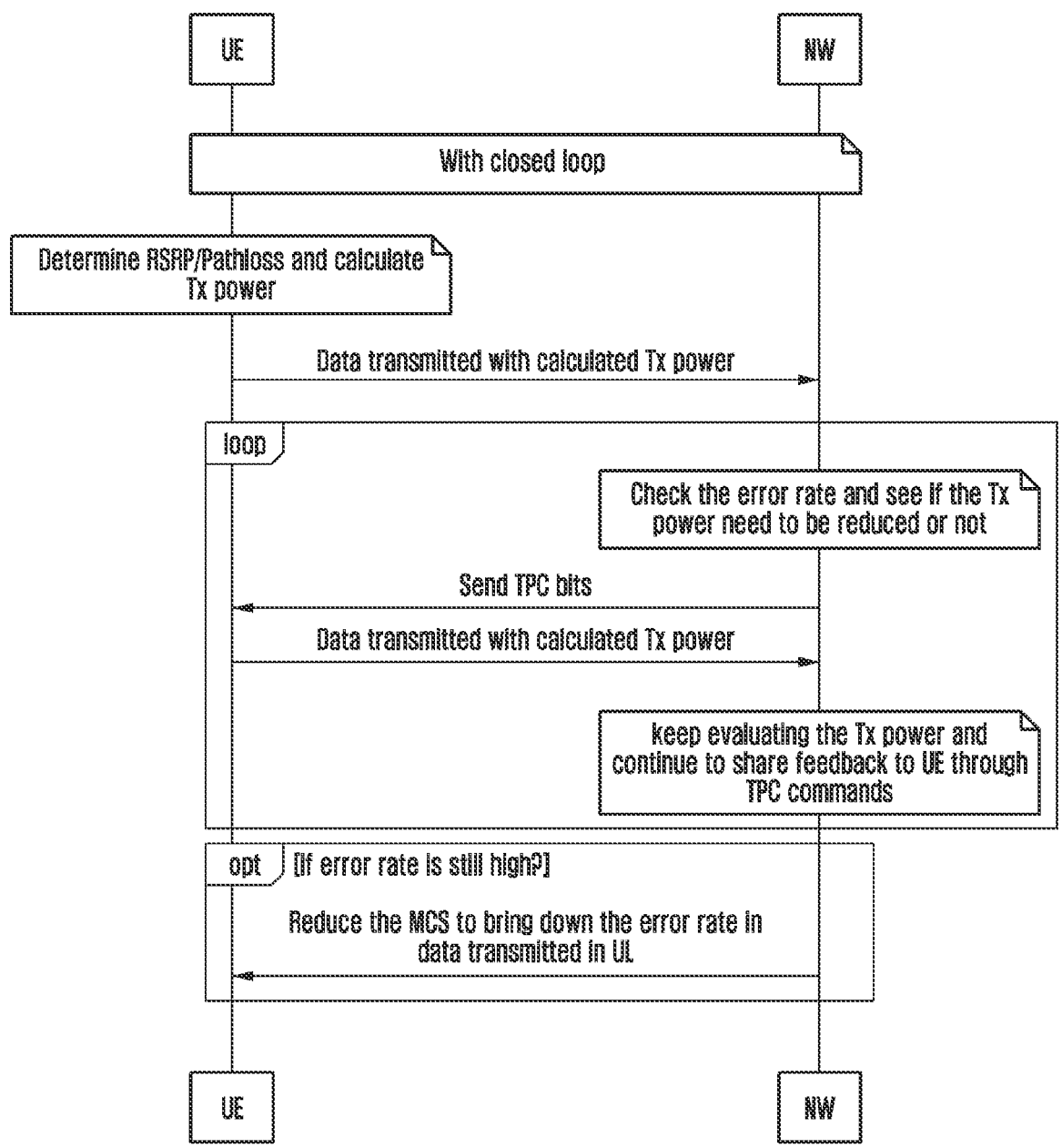
FIG. 2 illustrates signal diagram for key performance indicator (KPI) adjustment when inner loop is supported by the network, in accordance with existing art.
Figure 3:
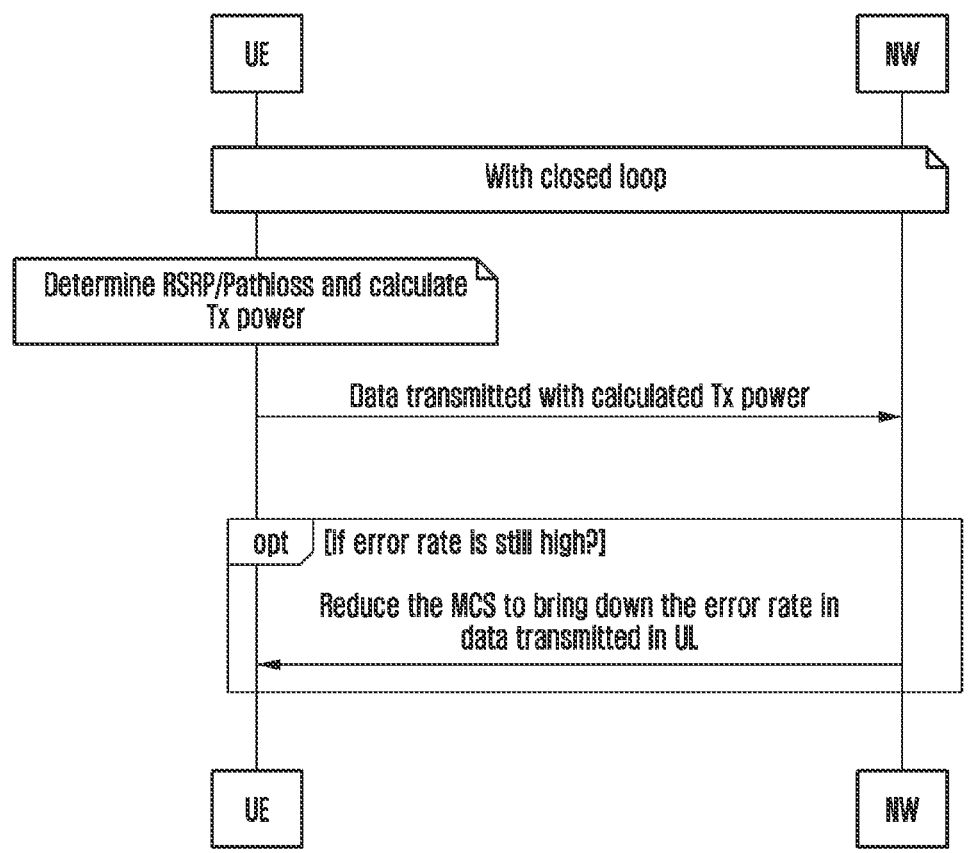
FIG. 3 illustrates signal diagram for key performance indicator (KPI) adjustment when inner loop is not supported by the network, in accordance with existing art.
Figure 4:
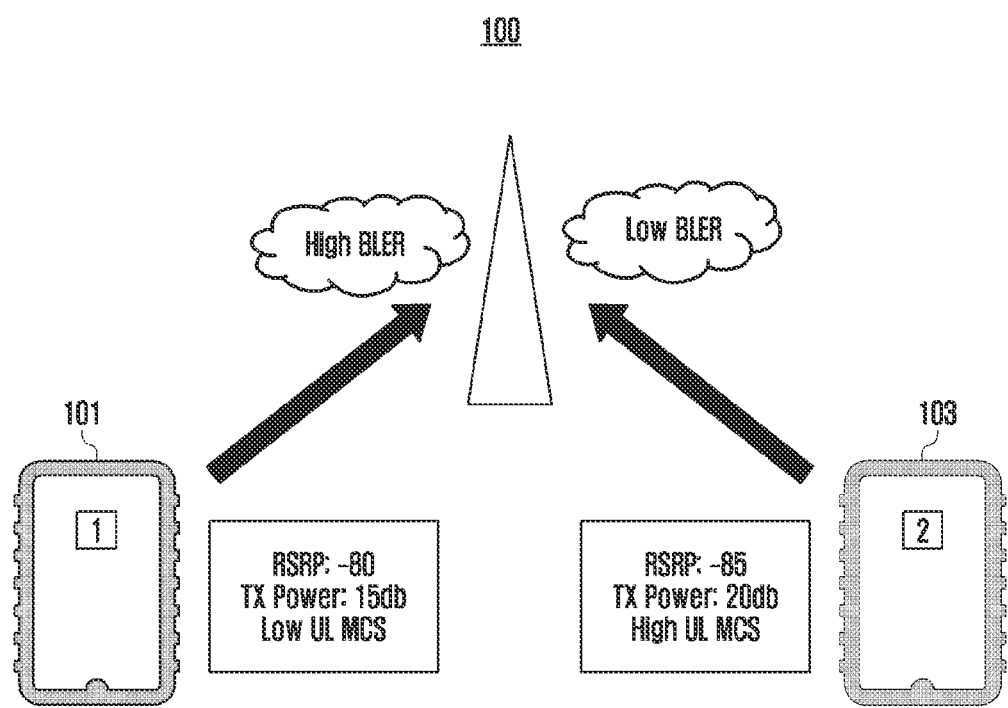
FIG. 4 illustrates a network environment depicting a normal uplink transmission, in accordance with existing art.
Figure 5:
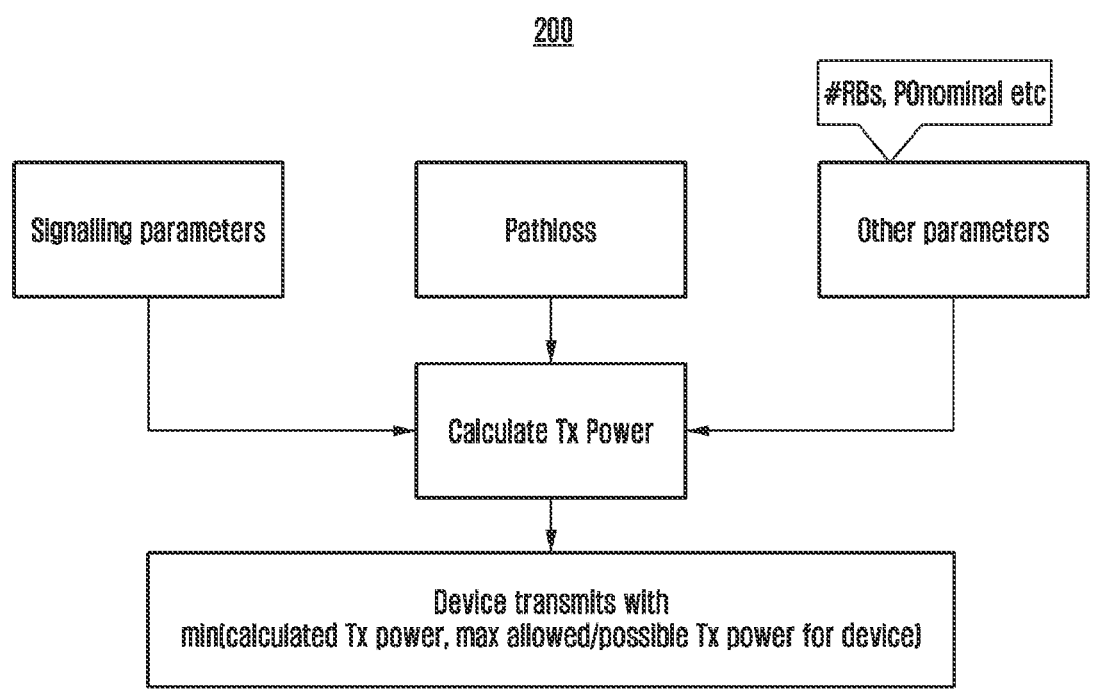
FIG. 5 illustrates a network environment depicting an open loop Tx power selection mechanism, in accordance with existing art.
Figure 6:
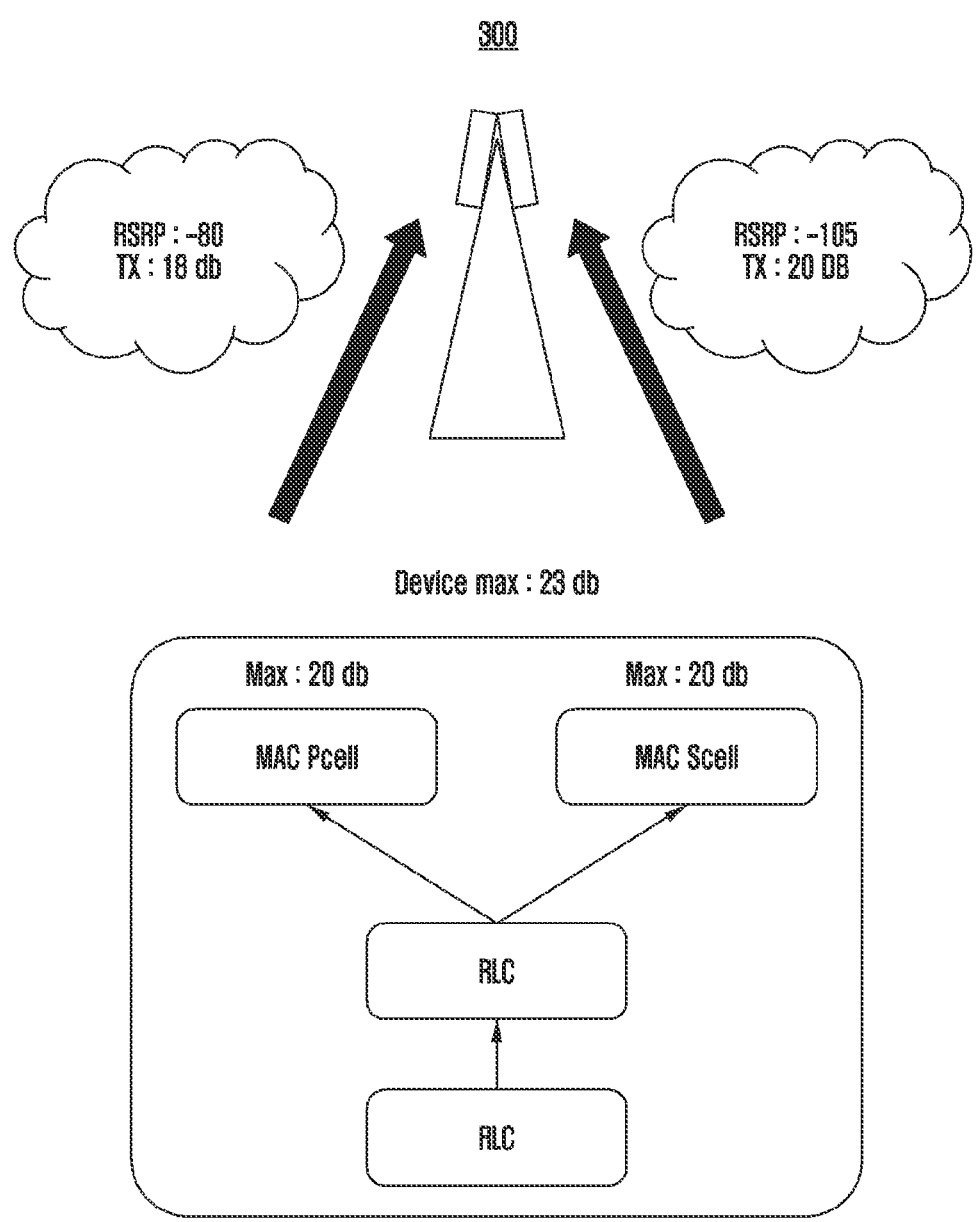
FIG. 6 illustrates a network environment depicting a simultaneous transmissions on dual stacks, in accordance with existing art.
Figure 7:
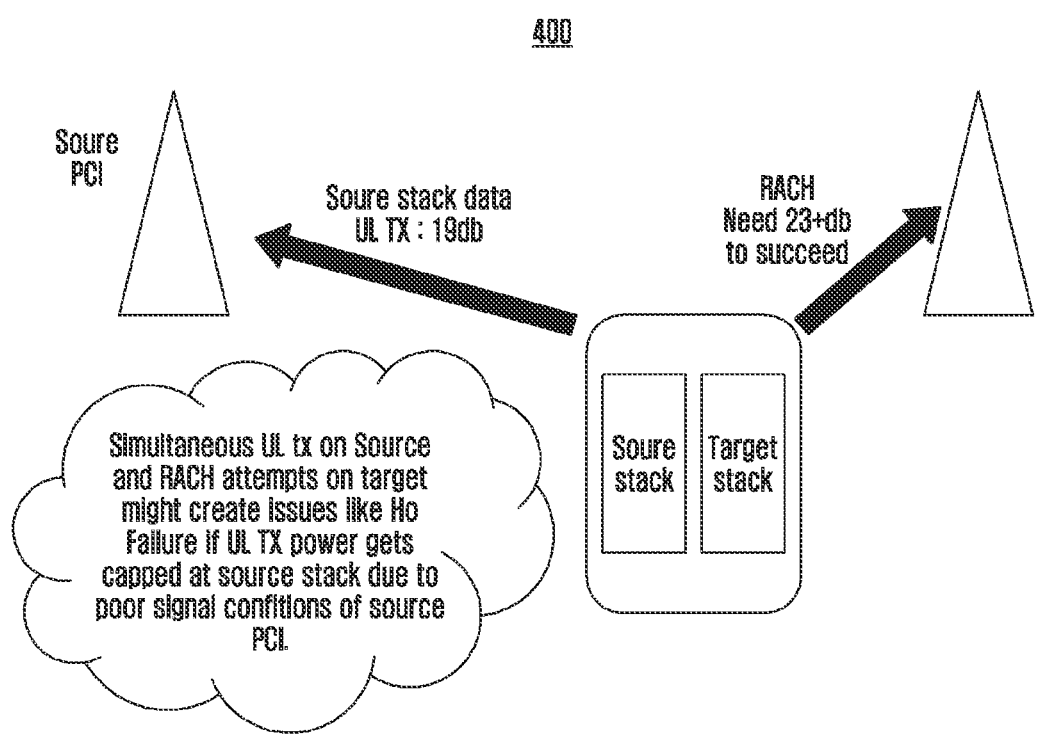
FIG. 7 illustrates a network environment depicting a simultaneous transmissions on dual stacks, in accordance with existing art.

Further, skilled artisans will appreciate that elements in the drawings are illustrated for simplicity and may not have been necessarily drawn to scale. For example, the flow charts illustrate the method in terms of the most prominent steps involved to help to improve understanding. Furthermore, in terms of the construction of the system, one or more components of the system may have been represented in the drawings by conventional symbols, and the drawings may show only those specific details that are pertinent to understanding the embodiments so as not to obscure the drawings with details that will be readily apparent to those of ordinary skill in the art having benefit of the description herein.

DETAILED DESCRIPTION

It should be understood at the outset that although illustrative example embodiments of the embodiments of the present disclosure are illustrated below, the present disclosure may be implemented using any number of techniques, whether currently known or in existence. The present disclosure should in no way be limited to the illustrative example embodiments, drawings, and techniques illustrated below, including the exemplary design and example embodiments illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

It should be noted that the term "UE" refers to any electronic UE used by a user such as a mobile UE, a desktop, a laptop, personal digital assistant (PDA) or similar UEs.

It should be noted that the terms "network" and "NW" have been interchangeably used throughout the specification and drawings.

Example embodiments will be described below in detail with reference to the accompanying drawings.

FIG. 8 illustrates a flow diagram depicting a method for for power management by a user equipment (UE) in an uplink transmission, in accordance with a first example embodiment.

As shown in FIG. 8, at step 801, the method 800 may comprise determining, at the UE, whether feedback related to a transmit power of the UE, from a network entity is available. For example, the UE may determine if network provides feedback that the transmit power of the UE is to be reduced on not based on an error rate. It should be noted that the UE may determine if feedback is available from the network using techniques known to a person skilled in the art. If it is determined that the feedback is available, then the UE uses closed loop power control to determine transmit power in accordance with existing techniques. However, if it is determined start the feedback is not available then the methods 800 move to step 803.

At step 803, the method may comprise determining a first transmit power of the UE based on the determination and at least one of a plurality of transmitting parameters associated with the UE. In an embodiment, the determined first transmit power is less than or equal to, for example, a maximum allowed transmit power for the UE. In an embodiment, the plurality of transmitting parameters may include, but not limited to, path loss, signalling parameters, and a number of resource blocks. In a further embodiment, the signalling parameters may include, but not limited to, synchronization signal block (SSB) power and other parameters required for transmit power calculation. For example, the method 800 may determine a first transmit power Tx which is less than or equal to a high or maximum allowed transmit power Tm. It should be noted that the method 800 may determine the first transmit power using techniques known to a person skilled in the art.

Then, at step 805, the method 800 may comprises evaluating a first spectral efficiency of the UE upon transmitting data at the first transmit power in a predefined time duration, using a plurality of predefined parameters. In an embodiment, the plurality of predefined parameters includes allocated modulation and coding scheme (MCS), uplink layers and a block error rate (BLER) for the Uplink transmission of UE. For example, the UE may transmit data to the network entity at the first transmit power Tx for a predefined time duration 'X' and may determine first spectral efficiency as S1 of the UE during the transmission. It should be noted start the predefined time duration is configurable and can be configured by the UE.

Then, at step 807 the method 800 may comprise determining a plurality of second transmit power of the UE. Each of the plurality of second transmit power may be determined based on one of an increment and decrement from the first transmit power and the plurality of transmitting parameters associated with the UE. For example, the plurality of second transmit powers Tx', Tx" . . . may be determined either by incrementing the first transmit power or by decrementing the first transmit power by a predefined value. It should be noted that the plurality of second transmit power Tx', Tx" may be determined in same manner as that of the first transmit power Tx. For example, the predefined value may be 1, 2, 3 etc. Accordingly, if the predefined value is 1, then the second transmit power may be determined by implementing the first transmit power by the value of one.

Thereafter, at step 809, the method 800 may comprise evaluating a plurality of second spectral efficiencies corresponding to the plurality of second transmit power for the predefined time duration upon transmitting the data at the plurality of second transmit power. For example, the UE may transmit data to the network entity at the plurality of second transmit power Tx', Tx" . . . for the predefined time duration 'X' and may determine plurality of second spectral efficiency as S2, S3 . . . of the UE corresponding to each of the second transmit power. It should be noted that the plurality of second spectral efficiencies S2, S3 . . . may be determined in same manner as that of the spectral efficiency S1.

In an embodiment, the plurality of second transmit power may be determined by one of incrementing and decrementing the first transmit power by the predefined value till at least one second spectral efficiency among the plurality of second spectral efficiency is greater than the first spectral efficiency. For example, if Tx' is determined by increasing Tx by the value of 1 and S2 is less then S1, then the method 800 keeps determining further second transmit power. Now if S3 corresponding to the second transmit power Tx" is greater than S1, then then the method 800 does not further determine second transmit power.

Then, at step 811, the method 800 may comprise determining a high or maximum spectral efficiency among the first and the plurality of second spectral efficiencies. For example, the method 800 may determine a high or maximum spectral efficiency among S1, S2 and S3. In continuing with the above example, the method 800 may determine S3 as the high or maximum spectral efficiency.

Then, at step 813, the method 800 may comprise transmitting the data at a final transmit power among the first and the second plurality of second spectral efficiencies, wherein the final transmit power corresponds to the maximum spectral efficiency. In an embodiment, in continuing with the above example, the second transmit power S3 may be determined as the maximum spectral efficiency and accordingly, the data may be transmitted at the second transmit power Tx".

In a further embodiment, the method 800 may determine if at least one of a plurality of predefined conditions are satisfied. In an embodiment, the plurality of predefined conditions may include, but not limited to, change in a cell connected with the UE, and change in a radio link between the UE and the network entity. If any of the plurality of predefined conditions is satisfied such as the UE has been handed over to a different cell, then the method 800 may repeat steps 801-813, which are not reproduced here for the sake of brevity.

In a further embodiment, the method 800 may determine whether a path loss between the UE and the network entity is above a predetermined threshold. In an embodiment, the predetermined threshold may be configurable and may be configured by the UE. In response to determining that the path loss between the UE and the network entity is above the predetermined threshold, the method may redetermine the plurality of second transmit powers and may repeat steps 807-813, which are not reproduced here for the sake of brevity.

Figure 9A:
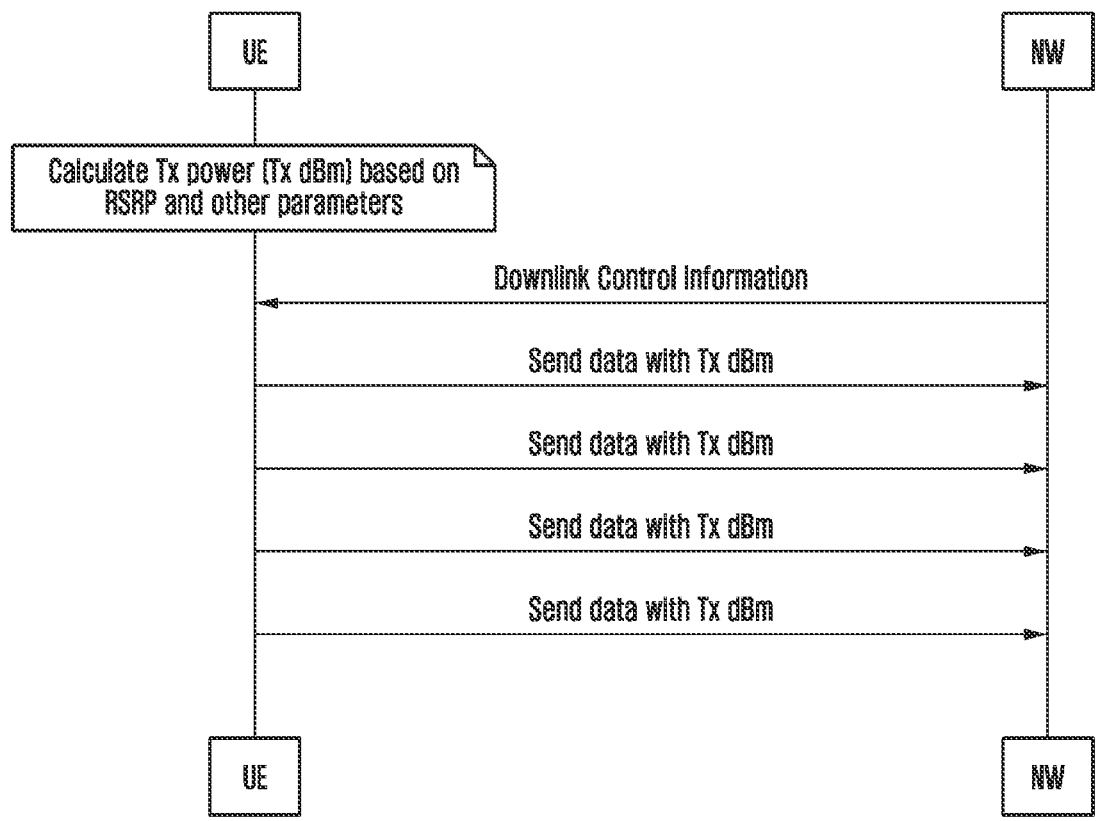
FIGS. 9(a) and 9(b) illustrate signal diagram for power control of a UE, in accordance with prior art and first embodiment respectively.
Figure 9B:
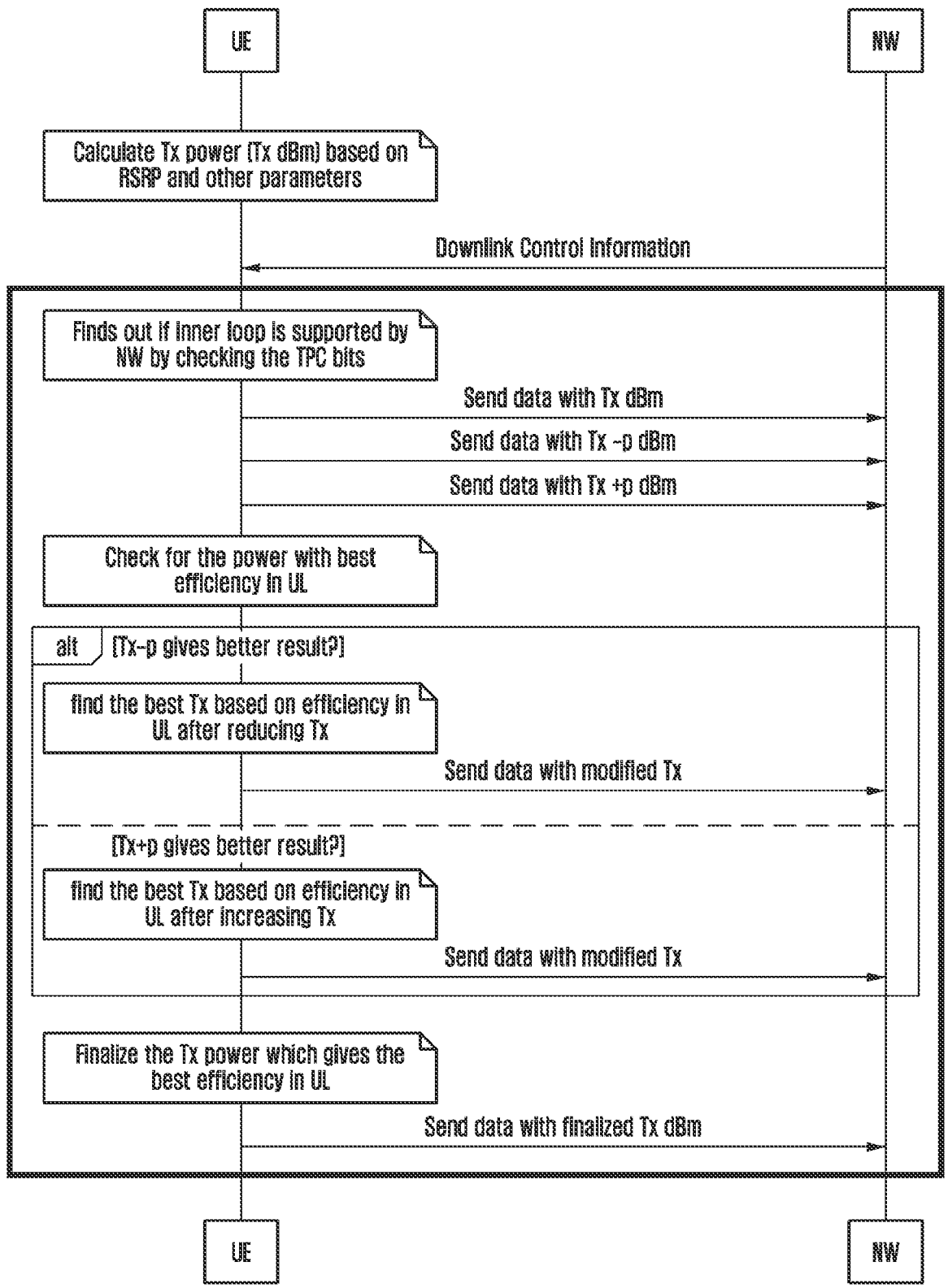

FIGS. 9(a) and 9(b) illustrate signal diagram for power control of a UE, in accordance with prior art and first embodiment respectively. As shown in FIG. 9(a), the UE determines a first transmit power Tx and keep transmitting the data at Tx. In contrast, as shown in FIG. 9(b), after determining the first transmit power Tx, the UE determines if closed loop power control is supported by the network. If not, the UE determines plurality of second transmit powers such as Tx−p, Tx+p and transmits the data at a transmit power which provides maximum spectral efficiency. Thus, the UE is able to optimize the transmit power and increase the efficiency.

Figure 10:
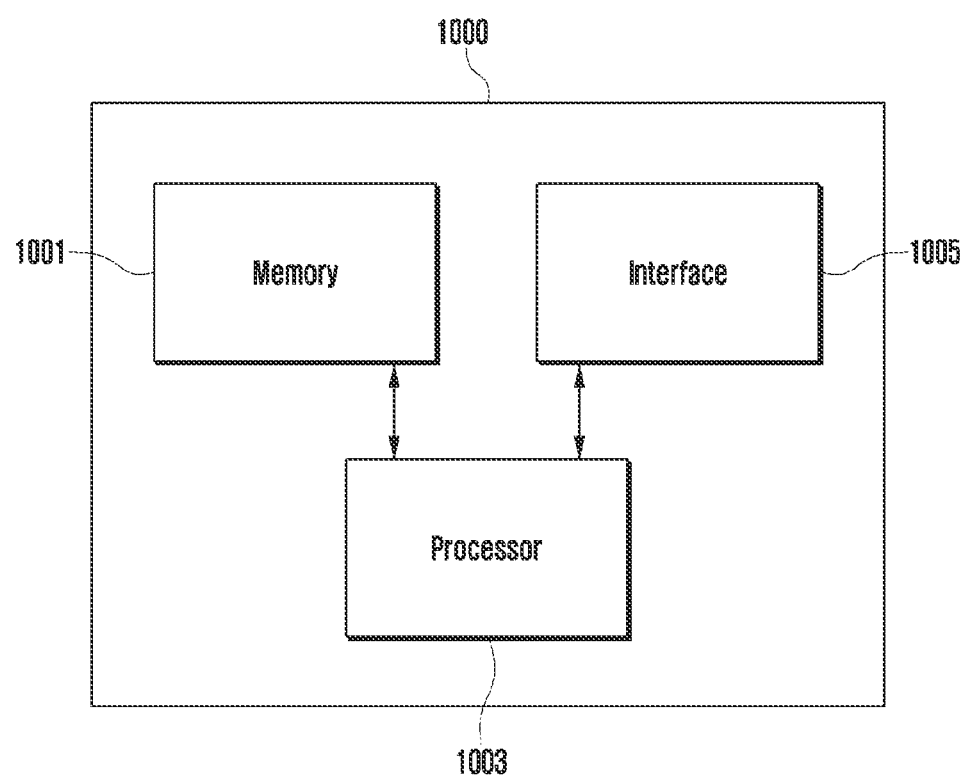
FIG. 10 illustrates a block diagram of an apparatus 1300 for power management by a user equipment (UE) in an uplink transmission, in accordance with a first example embodiment.

FIG. 10 illustrates a block diagram of a system 1000 for power management by a user equipment (UE) in an uplink transmission, in accordance with a first embodiment. In an embodiment, the apparatus 1000 may comprise a memory 1001, a processor 1003 and an interface 1005. The processor 1003 is coupled to the memory 1001 and the interface 1005. In an embodiment, the processor 1003 may be configured to perform the method as discussed in respect to FIGS. 8 and 9(b), the description of which is not reproduced here for the sake of brevity.

In an exemplary embodiment, the processor 1003 may be a single processing unit or a number of units, all of which could include multiple computing units. The processor 1003 may be implemented as one or more microprocessors, microcomputers, microcontrollers, digital signal processors, central processing units, state machines, logic circuitries, and/or any devices that manipulate signals based on operational instructions. Among other capabilities, the processor 1003 may be configured to fetch and execute computer-readable instructions and data stored in the memory 1001. The processor 1003 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory 1001. The predefined operating rule or artificial intelligence model is provided through training or learning.

In an embodiment, the memory 1001 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 1001 includes a cache or random access memory for the processor 1003. In alternative examples, the memory 1001 is separate from the processor 1003, such as a cache memory of a processor, the system memory, or other memory. The memory 1001 may be an external storage device or database for storing data. The memory 1001 is operable to store instructions executable by the processor 1003. The functions, acts or tasks illustrated in the figures or described may be performed by the programmed processor 1003 for executing the instructions stored in the memory 1001. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

In an embodiment, the system 1000 may be a part of the UE. In another embodiment, the system 1000 may be connected to the UE.

Figure 11:
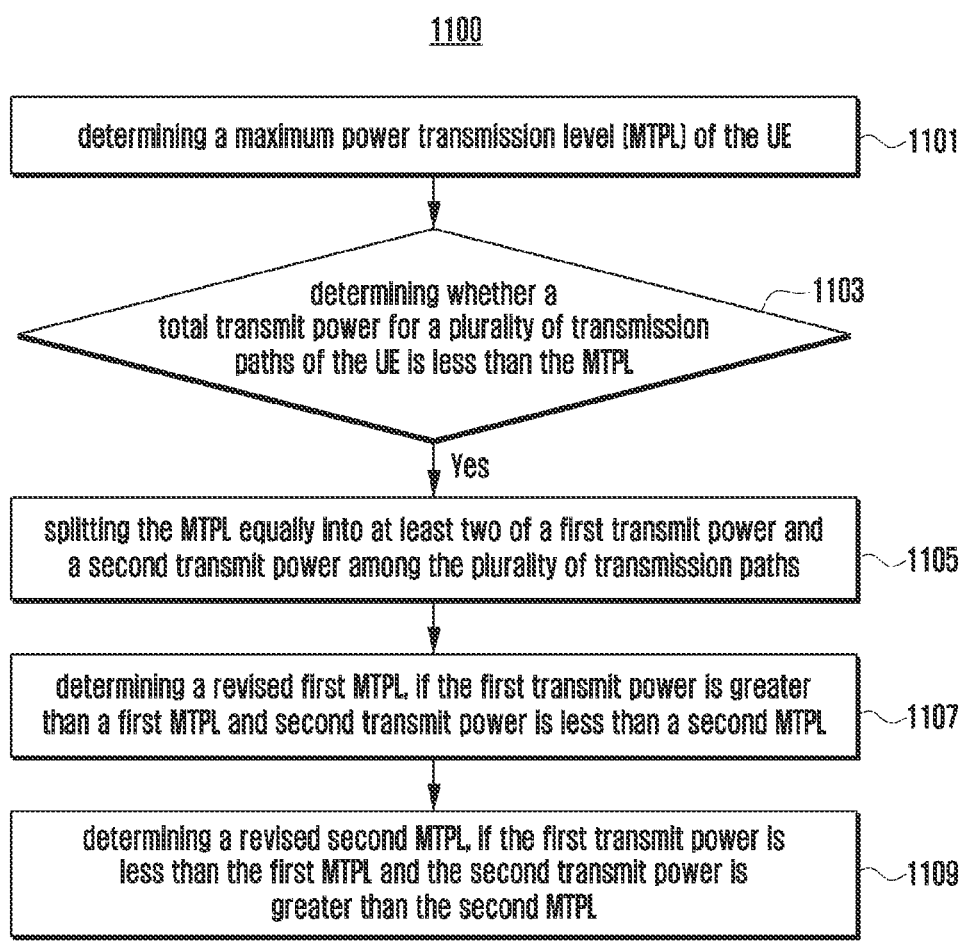
FIG. 11 illustrates a flow diagram depicting a method for power management by a user equipment (UE) in an uplink transmission, in accordance with a second example embodiment.

FIG. 11 illustrates a flow diagram depicting a method for power management by a user equipment (UE) in an uplink transmission, in accordance with a second embodiment. In an embodiment, the UE is connected to a plurality of networks. As shown in FIG. 11, at step 1101, the method 100 may comprises determining a maximum power transmission level (MTPL) of the UE. It should be noted that the MTPL may be determined using techniques known to a person skilled in the art.

Thereafter, at step 1103, the method 1100 may comprise determining whether a total transmit power for a plurality of transmission paths of the UE is less than the MTPL. In an exemplary scenario, in case of DSDA/DAPS, the UE may be connected to two networks and accordingly may transmit on two transmit paths, e.g., a first transmit path and a second transmit path. Accordingly, each transmit path may have different transmit power and different MTPL, e.g., a first transmit power (T1), a first MTPL (MTPL1) corresponding to the first transmit path and a second transmit power (T2) and second MTPL (MTPL2) corresponding to the second transmit path. Accordingly, the method 1100 may determine if the total transmit power ($Tx_{total}$) for the first and second transmit path is less than the MTPL. In an embodiment, the total transmit power may be determined based on the first transmit power, the second transmit power, MTPL1 and MTPL2. In an exemplary embodiment, the total transmit power may be determined as:

$$Tx_{total} = \min(T1, MTPL1) + \min(T2, MTPL2) \quad (1)$$

Further, in response to determining that the total transmit power is less than the MTPL, the method 1100 may perform following steps:

At step 1105, the method 1100 may comprise splitting the MTPL equally into at least two of a first transmit power and a second transmit power among the plurality of transmission paths. For example, the MTPL may be split equally between T1 and T2. It should be noted that there may be more than two transmit path and accordingly, the MTPL may be split equally between each transmit path.

Then, at step 1107, the method 1100 may comprise determining a revised first MTPL (MTPL1'), if the first transmit power is greater than a first MTPL and second transmit power is less than a second MTPL, e.g., if T1>MTPL 1 and T2<MTPL2. In an embodiment, the revised first MTPL (MTPL1') may be determined based on the first MTPL, the second MTPL and the second transmit power. In an exemplary embodiment, MTPL1' may be determined as:

$$MTPL1' = MTPL1 + (MTPL2 - T2) \quad (2)$$

Further, if the first transmit power is greater than the first MTPL, e.g., T1>MTPL1, then the data is transmitted through the first transmission path at the revised first MTPL, e.g., MTPL1'.

Thereafter, at step 1109, the method 1100 may comprise determining a revised second MTPL, if the first transmit power is less than the first MTPL and the second transmit power is greater than the second MTPL, e.g., if T1<MTPL 1 and T2>MTPL2. In an embodiment, the revised second MTPL (MTPL2') may be determined based on the first MTPL, the second MTPL and the first transmit power. In an exemplary embodiment, MTPL2' may be determined as:

$$\text{MTPL2'}=\text{MTPL2}+(\text{MTPL1}-T1) \quad (3)$$

Further, if the second transmit power is greater than the second MTPL, e.g., T2>MTPL2, then the data is transmitted through the second transmission path at the revised second MTPL, e.g., MTPL2'.

However, if the second transmit power is less than the second MTPL, e.g., T2<MTPL2, then the data is transmitted through the first and second transmission path at the first transmit power and the second transmit power, respectively.

This way, if the signal condition of first transmit path is a good signal condition (Tx power required is not equal to max value) and signal condition of second transmit path is in a poor condition (Tx power required is greater than max value), then the available transmit power of the first transmit path may be given to the second transmit path, thereby improving the signal condition of second transmit path. Hence, transmit power between the plurality of transmit paths may be balanced. This embodiment may be particularly important for cases of uplink carrier aggregation (ULCA) where dynamic power sharing (DPS) is not available to balance the powers.

Figure 12A:
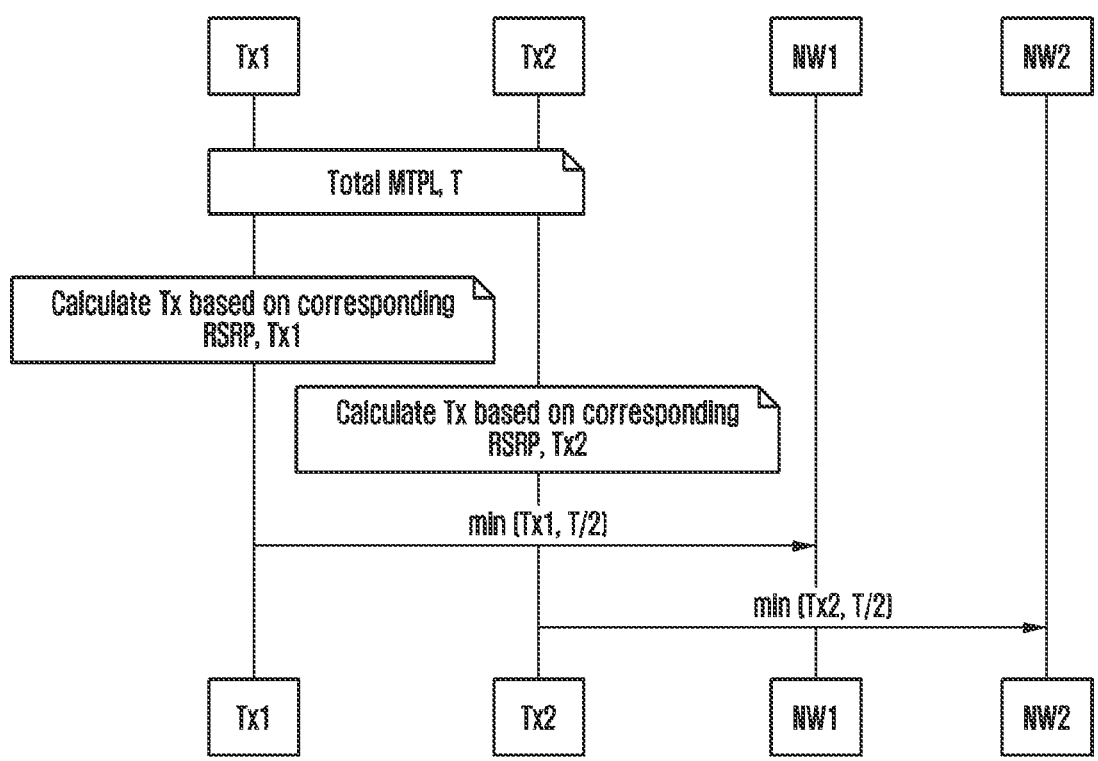
FIGS. 12(a) and 12(b) illustrate signal diagram for power control of a UE, in accordance with prior art and second example embodiment respectively.
Figure 12B:
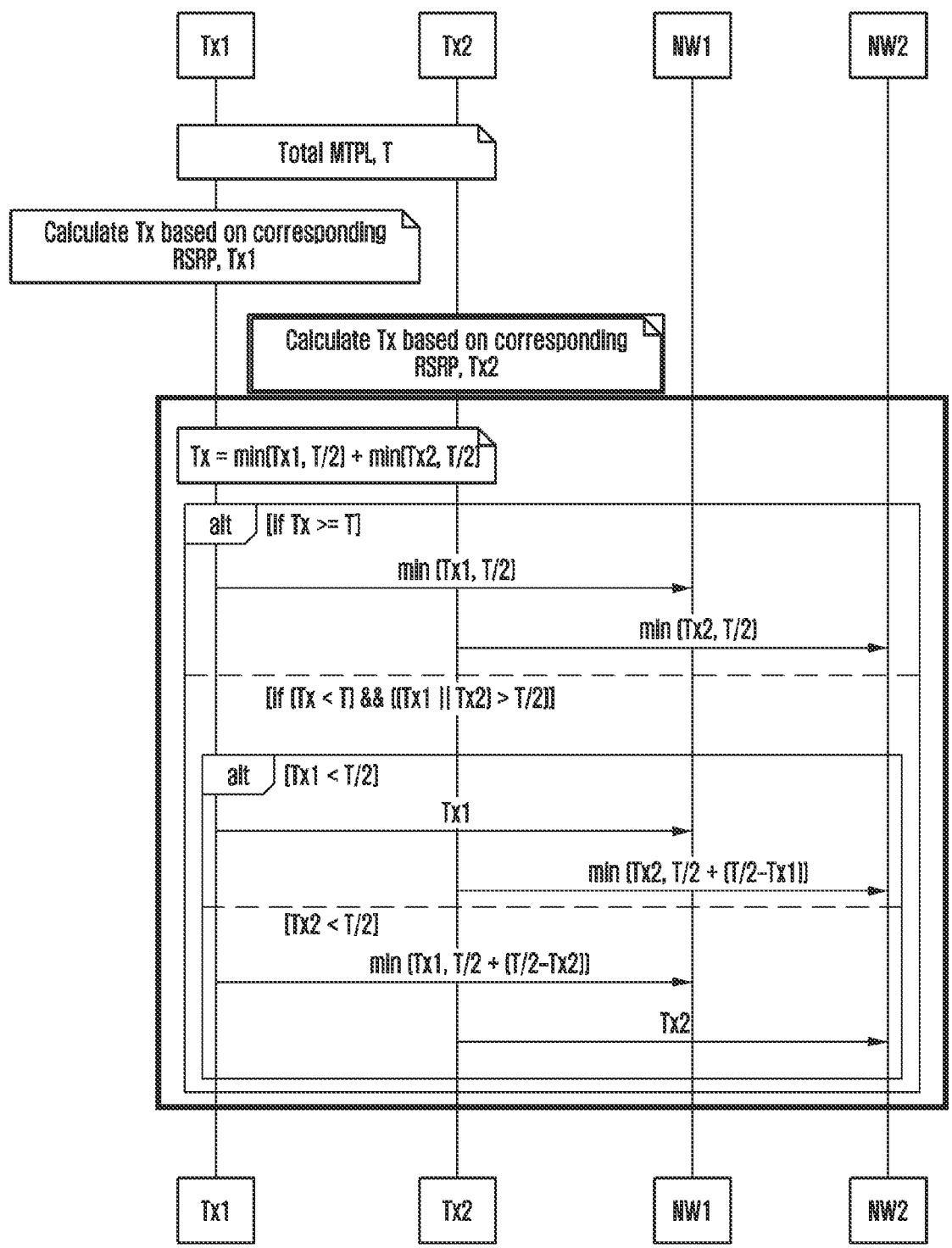

FIGS. 12(*a*) and 12(*b*) illustrate signal diagram for power control of a UE, in accordance with prior art and second embodiment respectively. As shown in FIG. 12(*a*), the UE transmits on the first transmit path (Tx1) at a power e.g., minimum of T1 and MTPL/2 (T/2). Similarly, the UE transmits on the second transmit path (Tx2) at a power e.g., minimum of T2 and MTPL/2 (T/2). Hence, the transmit powers are fixed. In contrast, as shown in FIG. 12(*b*), after determining T1 and T2, the required transmit power for each of the transmit path is determined in accordance with technique of FIG. 11. Thus, the UE is able to balance the transmit power between the plurality of paths.

Figure 13:
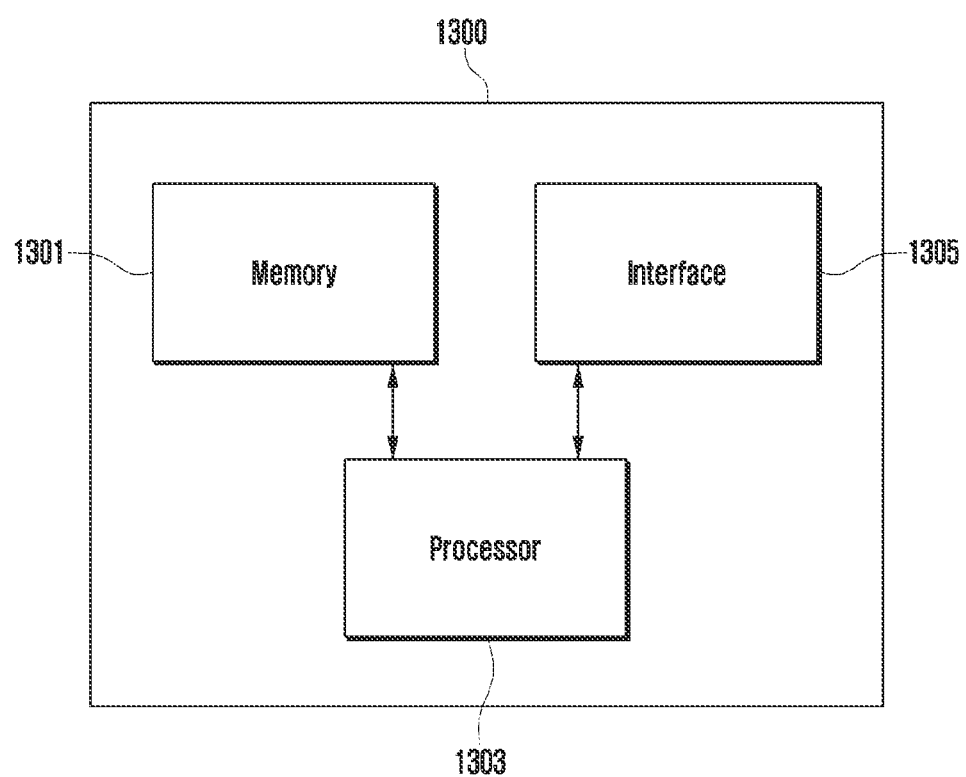
FIG. 13 illustrates a block diagram of a system 1300 for power management by a user equipment (UE) in an uplink transmission, in accordance with a second example embodiment.

FIG. 13 illustrates a block diagram of a system 1300 for power management by a user equipment (UE) in an uplink transmission, in accordance with a second embodiment. In an embodiment, the apparatus 1300 may comprise a memory 1301, a processor 1303 and an interface 1305. The processor 1303, comprising processing circuitry, is coupled to the memory 1301 and the interface 1305. In an embodiment, the processor 1303 may be configured to perform the method as discussed in respect to FIGS. 11 and 12(*b*), the description of which is not reproduced here for the sake of brevity.

In an exemplary embodiment, the processor 1303 may be a single processing unit or a number of units, all of which could include multiple computing units. The processor 1303 may be implemented as one or more microprocessors, microcomputers, microcontrollers, digital signal processors, central processing units, state machines, logic circuitries, and/or any devices that manipulate signals based on operational instructions. Among other capabilities, the processor 1303 may be configured to fetch and execute computer-readable instructions and data stored in the memory 1301. The processor 1303 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory 1301. The predefined operating rule or artificial intelligence model is provided through training or learning.

In an embodiment, the memory 1301 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 1301 includes a cache or random access memory for the processor 1303. In alternative examples, the memory 1301 is separate from the processor 1303, such as a cache memory of a processor, the system memory, or other memory. The memory 1301 may be an external storage device or database for storing data. The memory 1301 is operable to store instructions executable by the processor 1303. The functions, acts or tasks illustrated in the figures or described may be performed by the programmed processor 1303 for executing the instructions stored in the memory 1301. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

In an embodiment, the system 1300 may be a part of the UE. In another embodiment, the system 1300 may be connected to the UE.

Hence, the disclosed techniques provide various advantages such as:
- Ensuring that the interference at network side will not be higher just by increasing the Tx power by reducing the Tx power as well by considering the spectral efficiency at different Tx levels.
- Providing inner loop power control functionality at UE side when the inner loop is not supported at network side and find the best suitable transmit power to achieve the best UL QoS at UE.
- Balancing of power between plurality of transmit paths While specific language has been used to describe the disclosure, any limitations arising on account of the same are not intended. As would be apparent to a person in the art, various working modifications may be made to the method in order to implement concepts taught herein.

The drawings and the forgoing description give examples of embodiments. Those skilled in the art will appreciate that one or more of the described elements may well be combined into a single functional element. Alternatively, certain elements may be split into multiple functional elements. Elements from any embodiment may be added to another embodiment(s). For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for power management by a user equipment (UE) in an uplink transmission, the method comprising:
   determining, at the UE, whether feedback related to a transmit power of the UE, from a network entity, is available;
   determining a first transmit power of the UE based on the determination and at least one of a plurality of transmitting parameters associated with the UE;
   evaluating a first spectral efficiency of the UE upon transmitting data at the first transmit power in a predefined time duration, using a plurality of predefined parameters;
   determining a plurality of second transmit power, each of the plurality of second transmit power determined based on at least one: of an increment and decrement from the first transmit power and the plurality of transmitting parameters associated with the UE;
   evaluating a plurality of second spectral efficiencies corresponding to the plurality of second transmit power for the predefined time duration upon transmitting the data at the plurality of second transmit power;
   determining a spectral efficiency among the first and the plurality of second spectral efficiencies; and
   transmitting the data at a final transmit power among the first and the second plurality of second spectral efficiencies, wherein the final transmit power corresponds to the determined spectral efficiency.

2. The method as claimed in claim 1, wherein the determined first transmit power is less than or equal to a maximum allowed transmit power for the UE.

3. The method as claimed in claim 1, wherein determining the plurality of second transmit power comprises:
   repeating the step of determining the plurality of second transmit powers by one of incrementing and decrementing the first transmit power by a predefined value till at least one second spectral efficiency among the plurality of second spectral efficiency is greater than the first spectral efficiency.

4. The method as claimed in claim 1, wherein the plurality of predefined parameters includes allocated modulation and coding scheme (MCS), uplink layers and a block error rate (BLER) for the Uplink transmission of UE.

5. The method as claimed in claim 1, wherein the plurality of transmitting parameters includes path loss, signalling parameters, and a number of resource blocks.

6. The method as claimed in claim 1, further comprises:
   repeating the steps of determining, evaluating and transmitting if at least one of a plurality of predefined conditions are satisfied, wherein the plurality of predefined conditions include change in a cell connected with the UE, and change in a radio link between the UE and the network entity.

7. The method as claimed in claim 1, further comprising:
   determining whether a path loss between the UE and the network entity is above a predetermined threshold;
   in response to determining that the path loss between the UE and the network entity is above the predetermined threshold, the method comprises:
      redetermining the plurality of second transmit powers;
      revaluating the first and the plurality of second spectral efficiencies;
      determining a maximum spectral efficiency, as the spectral efficiency, among the revaluated plurality of second spectral efficiencies; and
      transmitting the data at a revaluated final transmit power, wherein the revaluated final transmit power corresponds to the revaluated maximum spectral efficiency.

8. A method for power management by a user equipment (UE) in an uplink transmission, the method comprising:
   determining a power transmission level (MTPL) of the UE;
   determining whether a total transmit power for a plurality of transmission paths of the UE is less than the MTPL;
   in response to determining that the total transmit power is less than the MTPL, the method comprises:
      splitting the MTPL equally into at least two of a first transmit power and a second transmit power among the plurality of transmission paths, wherein a first transmit power corresponds to a first transmission path and the second transmit power corresponds to a second transmission path among the plurality of transmission paths;
      determining a revised first MTPL, if the first transmit power is greater than a first MTPL and second transmit power is less than a second MTPL, wherein the first MTPL corresponds to the power transmission level of first transmission path and the second MTPL corresponds to the power transmission level of second transmission path; and
      determining a revised second MTPL, if the first transmit power is less than the first MTPL and the second transmit power is greater than the second MTPL.

9. The method as claimed in claim 8, further comprising:
   transmitting data at the first transmit power and the second transmit power, if the second transmit power is less than the second MTPL.

10. The method as claimed in claim 8, further comprising:
    determining the total transmit power based on the first MTPL, the second MTPL and the second transmit power.

11. The method as claimed in claim 8, further comprising:
    determining the revised first MTPL based on the total transmit power and the second transmit power.

12. The method as claimed in claim 8, further comprising:
    determining the revised second MTPL based on the first MTPL, the second MTPL and the first transmit power.

13. The method as claimed in claim 8, further comprising:
    transmitting the data through the first transmission path at the revised first MTPL, if the first transmit power is greater than the first MTPL; and
    transmitting the data through the second transmission path at the revised second MTPL, if the second transmit power is greater than the second MTPL.

14. A system for power management by a user equipment (UE) in an uplink transmission, the system comprising:
    a memory; and
    a processor coupled to the memory and configured to:
       determine, at the UE, whether feedback related to a transmit power of the UE, from a network entity is available;

determine a first transmit power of the UE based on the determination and at least one of a plurality of transmitting parameters associated with the UE;

evaluate a first spectral efficiency of the UE upon transmitting data at the first transmit power in a predefined time duration, using a plurality of predefined parameters;

determine a plurality of second transmit powers, each of the plurality of second transmit powers determined based on at least one of: an increment and decrement from the first transmit power, and the plurality of transmitting parameters associated with the UE;

evaluate a plurality of second spectral efficiencies corresponding to the plurality of second transmit power for the predefined time duration upon transmitting the data at the plurality of second transmit power;

determine a spectral efficiency among the first and the plurality of second spectral efficiencies; and transmit the data at a final transmit power among the first and the second plurality of second spectral efficiencies, wherein the final transmit power corresponds to the spectral efficiency.

15. The system as claimed in claim 14, wherein the determined first transmit power is less than or equal to a maximum allowed transmit power for the UE.

16. The system as claimed in claim 14, wherein for determining the plurality of second transmit power comprises, the processor is configured to:

determine the plurality of second transmit powers by one of incrementing and decrementing the first transmit power by a predefined value till at least one second spectral efficiency among the plurality of second spectral efficiency is greater than the first spectral efficiency.

17. The system as claimed in claim 14, wherein the plurality of predefined parameters includes allocated modulation and coding scheme (MCS), uplink layers and a block error rate (BLER) for the Uplink transmission of UE.

18. The system as claimed in claim 14, wherein the plurality of transmitting parameters includes path loss, signalling parameters, and a number of resource blocks.

19. The system as claimed in claim 14, wherein the processor is further configured to:

determine, evaluate and transmit if at least one of a plurality of predefined conditions are satisfied, wherein the plurality of predefined conditions include change in a cell connected with the UE, and change in a radio link between the UE and the network entity.

* * * * *